US012490858B2

United States Patent
Mandarino et al.

(10) Patent No.: US 12,490,858 B2
(45) Date of Patent: Dec. 9, 2025

(54) SYSTEM AND METHOD OF BROILER HEATING ELEMENT CONTROL

(71) Applicant: Marmon Foodservice Technologies, Inc., Osseo, MN (US)

(72) Inventors: Nicholas Mandarino, Aurora, IL (US); Jonathan Sammon, Oak Park, IL (US); Benjamin Slotarski, Palatine, IL (US); Christian Braun, Lake Forest, IL (US); Leonard Zelek, Chicago, IL (US)

(73) Assignee: Marmon Foodservice Technologies, Inc., Osseo, MN (US)

( * ) Notice: Subject to any disclaimer, the term of this patent is extended or adjusted under 35 U.S.C. 154(b) by 874 days.

(21) Appl. No.: 17/749,649

(22) Filed: May 20, 2022

(65) Prior Publication Data

US 2022/0369860 A1  Nov. 24, 2022

Related U.S. Application Data

(60) Provisional application No. 63/191,614, filed on May 21, 2021.

(51) Int. Cl.
| | |
|---|---|
| *A47J 37/04* | (2006.01) |
| *A21B 1/40* | (2006.01) |
| *A21B 1/48* | (2006.01) |
| *A47J 27/00* | (2006.01) |
| *A47J 36/32* | (2006.01) |

(52) U.S. Cl.
CPC .............. *A47J 37/044* (2013.01); *A21B 1/48* (2013.01); *A47J 27/002* (2013.01); *A47J 36/32* (2013.01); *A47J 37/045* (2013.01); *A21B 1/40* (2013.01)

(58) Field of Classification Search
None
See application file for complete search history.

(56) References Cited

U.S. PATENT DOCUMENTS

| | | | |
|---|---|---|---|
| 6,595,117 B1 | 7/2003 | Jones et al. | |
| 9,585,400 B2 | 3/2017 | Wiker et al. | |
| 2006/0251784 A1* | 11/2006 | Sells | A21B 3/04 426/510 |
| 2011/0269085 A1* | 11/2011 | Wiker | A21B 1/48 219/388 |

(Continued)

FOREIGN PATENT DOCUMENTS

| | | | |
|---|---|---|---|
| CN | 106361172 A | * | 2/2017 |
| WO | 2020091840 A1 | | 5/2020 |

OTHER PUBLICATIONS

CN 106361172 A (Zhou, Ting-you) Feb. 1, 2017 [retrieved May 17, 2025]. Retrieved from Foreign Image and Text database, translation by Clarivate Analytics. (Year: 2017).*

*Primary Examiner* — John J Norton
(74) *Attorney, Agent, or Firm* — Andrus Intellectual Property Law, LLP

(57) ABSTRACT

A plurality of heat sources are arranged about at least one conveyor. The plurality of heat sources are configured to output heat towards the at least one conveyor. At least one temperature sensor is arranged at a food product inlet relative to the at least one conveyor. A controller is configured to receive temperature measurements from the at least one temperature sensor and to operate at least one heat source of the plurality of heat sources between a high fire condition and a low fire condition in an idle mode operation and a cooking mode operation.

14 Claims, 5 Drawing Sheets

(56) References Cited

U.S. PATENT DOCUMENTS

| | | | |
|---|---|---|---|
| 2013/0306616 A1* | 11/2013 | Wildebush | A47J 37/0857 |
| | | | 219/413 |
| 2014/0199446 A1 | 7/2014 | Huegerich | |
| 2014/0234497 A1* | 8/2014 | Sladecek | A47J 36/16 |
| | | | 99/331 |
| 2018/0289209 A1 | 10/2018 | Yazvin et al. | |
| 2019/0290063 A1 | 9/2019 | Shei | |
| 2021/0121003 A1* | 4/2021 | Roever | A47J 36/2483 |
| 2021/0127688 A1 | 5/2021 | Sammon et al. | |
| 2021/0127898 A1 | 5/2021 | Sammon et al. | |

* cited by examiner

SYSTEM AND METHOD OF BROILER HEATING ELEMENT CONTROL

CROSS-REFERENCE TO RELATED APPLICATIONS

The present application claims priority of U.S. Provisional Patent Application No. 63/191,614, filed on May 21, 2021, which is incorporated by reference in its entirety.

BACKGROUND

The present disclosure relates to heat treatment of food. More specifically, the present disclosure relates to a warming and holding device for cooked food product in a cooking appliance. In various embodiments, the cooking appliance may be a broiler, oven, toaster, or the like for cooking, baking, or toasting a plurality of food items.

Heat transfer systems may be used to provide thermal energy to a broiler, oven, toaster, or the like for use in the heat treatment of food items to achieve cooking, baking, or toasting of the food item. Conveyor systems move the food item in relation to one or more heat sources to achieve a continuous cooking, baking, or toasting process.

U.S. Patent Application Publication No. 2018/0289209 discloses a conveyor toaster which includes a conveyor assembly with a bracket and a conveyor belt. The conveyor belt rotates about the first and second gears. A drive motor operates to move the conveyor belt about the first and second gears. A platen is configured to be heated and is positioned relative to the conveyor belt. A mounting bracket is connected to the bracket of the conveyor assembly. Movement of the mounting bracket changes the position of the conveyor assembly relative to the platen. This application is incorporated by reference herein in its entirety.

U.S. Patent Application Publication No. 2019/0290063 is incorporated by reference herein in its entirety and relates to a heat transfer system. The heat transfer system includes a mixing chamber that surrounds the heat source. An air inlet provides a flow of pressurized air into the mixing chamber. The mixing chamber directs the flow of air past the heat source or direct heating of the flow of air by the heat source. The flow of air is further directed out of the mixing chamber through an outlet to impinge upon a food product.

U.S. Patent Application Publication No. 2014/0199446 relates to a conveyor toaster with a housing and a split-conveyor; International Publication Number WO2020/091840 discloses a belted warmer assembly with a heated rotating drum, a belt roller, and a belt; U.S. Pat. No. 6,595,117 discloses a high-speed variable size toaster; and U.S. Pat. No. 9,585,400 discloses a conveyor oven with a sensor positioned to detect an event that will cause a decrease in the internal temperature of a tunnel, each of these references is incorporated herein by reference in their entireties.

U.S. Patent Application Publication No. 2021/0127688, entitled Dynamic Cooking with Limited Control Authority Conveyor Compensation and U.S. Patent Application Publication No. 2021/0127898, entitled Cooking Appliance with Cooked Food Holding Apparatus both disclose heat transfer systems for cooking a food product. Both of these references are incorporated herein by reference in their entireties.

BRIEF DISCLOSURE

An example of a heat transfer system for cooking a food product includes an enclosure comprising a food product inlet, a food product outlet, and a plurality of walls. At least one conveyor extends into the enclosure from the food product inlet. A plurality of heat sources are arranged about the at least one conveyor. The plurality of heat sources configured to output heat towards the at least one conveyor. At least one temperature sensor is arranged at the food product inlet relative to the at least one conveyor. A controller is configured to receive temperature measurements from the at least one temperature sensor and to operate at least one heat source of the plurality of heat sources between a high fire condition and a low fire condition in an idle mode operation and a cooking mode operation.

In further examples, the controller, in the idle mode operation, is configured to maintain the temperature measurements between a cooking temperature setpoint and an upper temperature setpoint, the upper temperature setpoint being above the cooking temperature setpoint. The controller, in the idle mode operation, operates at least one of the plurality of heat sources in the high fire condition until the temperature measurements reach the upper temperature setpoint, and the controller operates at least one of the plurality of heat sources in the low fire condition until the temperature measurements reach the cooking temperature setpoint. The controller operates in the cooking mode operation when the temperature measurements fall below a lower temperature setpoint below the cooking temperature setpoint. The controller, in the cooking mode operation, is configured to operate at least one heat source of the plurality of heat sources in the high fire condition for a predetermined time period. The predetermined time period begins after the temperature measurements rise above the lower temperature setpoint. A plurality of temperature sensors are arranged at the food product inlet relative to lanes on the food product conveyor. The controller is configured such that when the temperature measurements from a temperature sensor of the plurality of temperature sensors falls below the lower temperature threshold, the predetermined time starts after the temperature measurements from the temperature sensor rise above the lower temperature setpoint.

In still further examples, a discharge ramp is positioned below the conveyor at an end of the conveyor opposite the food product inlet. A food product tray is positioned below the conveyor and configured to receive food product from the conveyor directed into the tray by the discharge ramp. A drip tray is positioned below the conveyor and angled in the direction of the discharge ramp, wherein the drip tray is configured to collect grease and direct the grease onto the discharge ramp for collection in the food product tray. In the low fire condition the plurality of heat sources output energy that is less than an energy output required to maintain the cooking temperature setpoint at the at least one temperature sensor. In the high fire condition the plurality of heat sources output energy that is greater than an energy output required to exceed the upper temperature setpoint at the at least one temperature sensor. The plurality of heat sources include a first heat source positioned above the conveyor and configured to remain in a low fire condition and a second heat source configured to operate at the low fire condition and the high fire condition. The second heat source is positioned above the conveyor towards the food product inlet and wherein the first heat source is internal the enclosure from the second heat source. The third heat source positioned below the conveyor and configured to operate at the low fire condition and the high fire condition.

An example of a method of cooking a food product includes providing a heat transfer system comprising an enclosure comprising a food product inlet, a food product outlet, and a plurality of walls, a conveyor, a plurality of heat sources arranged about the conveyor the plurality of heat sources configured to output heat towards the at least one conveyor, at least one temperature sensor arranged at the food product inlet relative to the at least one conveyor, and a controller. A current temperature is monitored at the at least one temperature sensor. A mode of operation is determined between an idle mode and a cooking mode with the controller based upon the current temperature. At least one of the heat sources is operated between a high fire condition and a low fire condition based upon the current temperature from the at least one temperature sensor and the mode of operation. The controller determines a cooking mode operation if the current temperature falls below a cooking temperature setpoint and a lower temperature setpoint, and otherwise determines an idle mode of operation.

In further examples, the cooking mode of operation includes operating at least one heat source of the plurality of heat sources in a high fire condition and starting a timer when the current temperature exceeds the lower temperature setpoint. When the timer exceeds a predetermined time, the at least one heat source of the plurality of heat sources is operated in the low fire condition and determining an idle mode of operation. The idle mode of operation includes operating the plurality of heat sources in the low fire condition and comparing the current temperature to a cooking temperature setpoint. If the current temperature falls below the cooking temperature setpoint, operating at least one heat source of the plurality of heat sources in the high fire condition and comparing the current temperature to an upper temperature setpoint. If the current temperature exceeds the upper temperature setpoint, the at least one heat source of the plurality of heat sources is operated in the low fire condition. The conveyor defines a plurality of food product lanes across the conveyor and comprising a plurality of temperature sensors which comprises the at least one temperature sensor, with a temperature sensor of the plurality of temperature sensors positioned at the food product inlet relative to each lane of the plurality of lanes across the conveyor.

DETAILED DISCLOSURE

Figure 1:
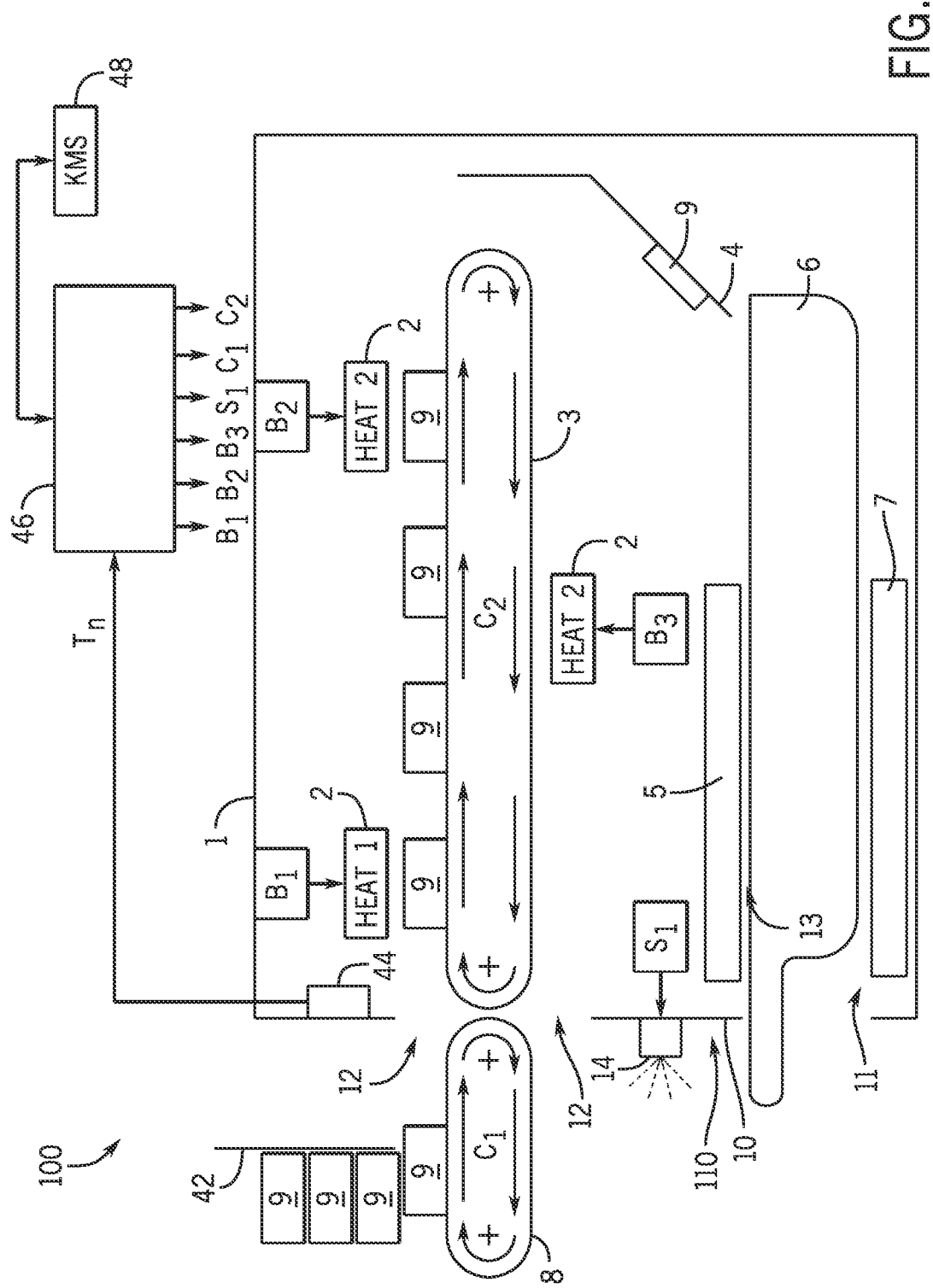
FIG. 1 depicts an example of a broiler.

FIG. 1 depicts an example of a broiler 100. It will be recognized that the broiler 100 of FIG. 1 is merely exemplary and other examples will fall within the scope of the present disclosure that includes more or fewer components than depicted in FIG. 1. That is, a person of ordinary skill in the art will recognize from the present disclosure that the example shown and described with respect to FIG. 1 may be modified or rearranged or implemented with more or fewer systems or components and arrive at embodiments within the scope of the present disclosure.

Broiler 100 is shown to include multiple heat transfer elements or heat sources 2 surrounded by an enclosure 1. Each heat source 2 as exemplarily described herein may be a gas burner. In other examples, the heat sources 2 may be electric heating elements, infrared heating elements, or any other suitable form of heating element as would be recognized by one of ordinary skill in the art. Although FIG. 1 depicts the broiler 100 as including three heat sources 2, other embodiments may include one, two, four, or any other desired number of heat sources 2, in any arrangement or configuration, as will be recognized by a person having ordinary skill in the art in view of the present disclosure.

The enclosure 1 is formed by a plurality of walls. The walls of the enclosure 1 may be constructed of sheet metal. The enclosure 1 includes a food product inlet 12 that permits the ingress of a food product 9 to the cooking area exposed to heat sources 2 and encapsulated by the enclosure 1. The enclosure 1 further includes a food product outlet 11 that permits the egress of the food product 9 from the cooking area encapsulated by the enclosure 1. The types of food product 9 cooked by a cooking appliance as described herein may include raw, uncooked, par-baked, or frozen versions of food products. The food products may have a variety of sizes or weights, and may include, but are not limited to, hamburger patties, chicken breasts, bread, and pizza. A cooking conveyor 3 moves the food product through the enclosure. The cooking conveyor 3 includes a wire, metal plate, or silicone belt that is driven between two gears. The cooking conveyor 3 receives the food product 9 at the food product inlet 12 and moves the food product through the enclosure past the heat sources 2. In an example, the cooking conveyor may be configured with a plurality of lanes, each lane suitable to cook food product. In an example, the cooking conveyor 3 may include one, two, three, four, or more lanes, and be configured to simultaneously receive a food product in each lane across the width of the cooking conveyor 3 and advance such food product through the enclosure 1. The lanes of the cooking conveyor 3 may be all defined upon a single cooking conveyor or may be spread across two or more cooking conveyors 3.

In the present disclosure, the exemplary embodiment of a chain-driven charbroiler cooking a hamburger patty will be used, although it will be recognized that other forms of broilers, ovens, or toasters may be similarly configured and other foods, including, but not limited to pizza, pizza crusts, bread, buns, toasted sandwiches, chicken cuts or patties, fish cuts or patties, beef cuts, plant or other protein patties, or the aforementioned hamburger patties may be heat treated in the manners as described herein.

Food product 9 may be supplied to the food product inlet 12 using a loading conveyor 8 and a loading assembly 42. Operation of the loading conveyor 8 moves food product 9 toward the food product inlet 12 of the enclosure 1. The loading assembly 42 may be any suitable device configured to store multiple food products 9 and to automatically deposit food product 9 onto the loading conveyor 8, which may for example be a hopper or magazine. In this way, a cooking cycle can be completed for a desired amount of food product 9 even when the desired amount of food product 9 exceeds a capacity of the enclosure 1. In an example, a loading assembly 42 and a loading conveyor 8 may sequentially introduce hamburger patties into an enclosure 1 having a maximum capacity of five patties to complete a cooking cycle of more than five patties without the need for manual intervention. However, in other examples, both the loading conveyor 8 and any associated loading assembly 42 may be omitted from the broiler 100, and food product 9 may be manually inserted into the enclosure 1 by a user.

Food product 9 is moved through broiler 100 on a cooking conveyor 3. In an example, heat sources 2 are situated both above and below the cooking conveyor 3 in order to complete a cooking process of the food product 9. In the example of FIG. 1, two heat sources 2 are arranged above the cooking conveyor 3, while one heat source 2 is located below the cooking conveyor 3. Although FIG. 1 depicts the cooking conveyor 3 as fully contained within the enclosure 1, in other examples, the cooking conveyor 3 can extend to or beyond the food product inlet 12. For example, the cooking conveyor 3 may extend beyond the inlet 12 and to the exterior of the enclosure 1 in cases where the loading conveyor 8 is omitted from the broiler 100.

As will be explained in further detail herein, the broiler 100 may further include an inlet sensor 44. It will be recognized that more or fewer sensors may be used in association with other embodiments while remaining within the scope of the present disclosure. In an example detailed further herein, at least one inlet sensor is associated with each lane of the plurality of lanes of the cooking conveyor 3. Inlet sensor 44 may be any type of sensing device configured to collect data indicating the presence of a food product 9 in the vicinity of the food product inlet 12. In examples provided with more detail herein, the inlet sensor 44 is a temperature sensor, for example a thermocouple. The inlet sensor 44 is exemplarily located on the interior of the enclosure 1 at a position above the loading conveyor 8, so as to sense temperature fluctuations associated with the introduction of food products into the inlet 12. The position of the inlet sensor 44 may be dependent on the field of view or the observable space the inlet sensor 44 is able to detect. In examples of broilers with more than one cooking conveyor 3 or more than one lane of product on one cooking conveyor, the broiler 100 may further include multiple inlet sensors 44 positioned relative to each lane to detect the introduction of food products to each lane.

Inlet sensor 44 transmits collected data as data signal $T_n$ to a controller 46. The controller 46 may be internal to the broiler 100 or it may be external to the broiler 100. In an example, the controller 46 is a computer processor that is located within the broiler 100, in a location shielded from the heat, humidity, and food particles of the broiler 100. In another example, the controller 46 is a computer that is located remotely from the broiler 100 and for example, receives the sensor data either through wired or wireless communication and returns control signals as described in further detail herein through a similar communicative connection.

The computer processor of controller 46 may be integral with or communicatively connected to a computer-readable medium upon which computer-readable code is stored. Upon execution of the computer-readable code by the processor, the processor performs functions and calculations as described herein and subsequently transmits control signals to the heat sources 2, the loading conveyor 8, and the cooking conveyor 3. The same or another computer-readable medium may be communicatively connected to the processor of the controller 46 and cooking models may be stored thereon for access and use by the processor. These cooking models, as described in further detail herein, may determine control signals $B_1$-$B_3$ provided to the heat sources 2. In still further examples, the controller 46 may further produce control signals $C_1$ and $C_2$ to control the speeds of the loading conveyor 8 and the cooking conveyor 3.

The controller 46, executing the computer-readable code and informed by the cooking models operates the various components of the broiler 100 at different conditions, for example, to provide more or less heat at the top or bottom of the food product 9, or to control the speed of the cooking conveyor 3 to control the overall cooking time. Control of the cooking conveyor 3 can determine the cooking time or time that the food product 9 is exposed to particular conditions created by one or more heat sources 2 adjacent to the cooking conveyor 3. Control of the heat sources 2 includes adjustment of the heat input into particular locations within the enclosure 1.

As will be described in further detail herein, the heat sources 2 can be controlled to ensure that each food product receives the required thermal treatment to cook the food product, while further recognizing when the broiler 100 is not currently in use and operate with an efficient use of energy when not cooking a food product.

Figure 2:
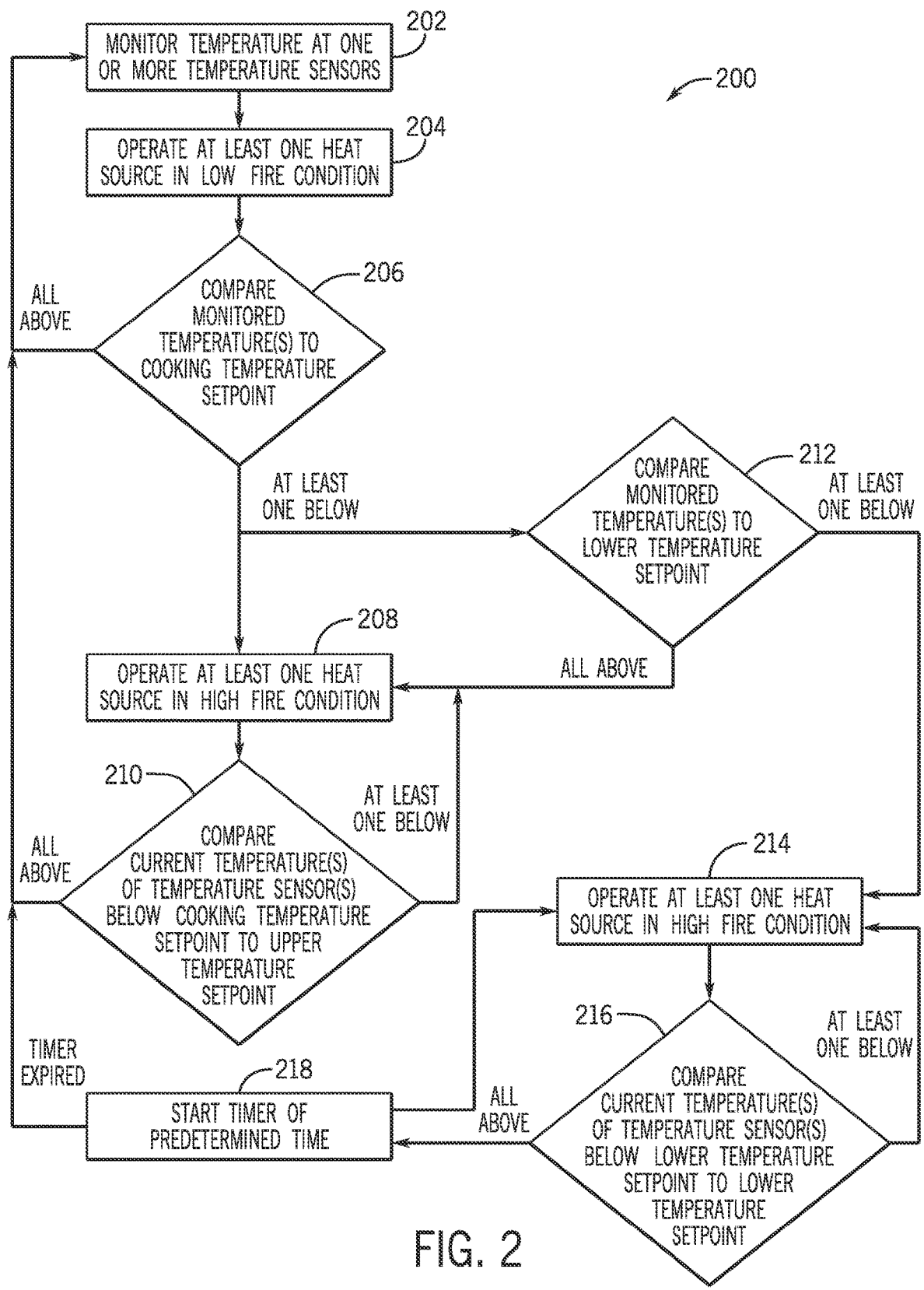
FIG. 2 is a flow chart that depicts an example of a method of heating element control.

FIG. 2 is a flowchart that depicts an example of a method 200 of control of the heating elements in a broiler. The method starts at 202 by monitoring the temperature at one or more temperature sensors, which may be thermocouples, arranged as inlet sensors 44 at the inlet to a broiler. In an example, a temperature sensor of the one or more temperature sensors is arranged relative to a lane of the cooking conveyor configured to receive food product. A non-limiting example of a broiler may include one cooking conveyor with four lanes of food product defined thereon. The heat sources are operated in a low fire condition at 204. The low fire condition is understood to be a relative condition, and which may be based upon the operational specifications of the broiler, the food product to be cooked, and/or the environmental conditions to be achieved within the enclosure. For example, the low fire condition may be 50,000 BTU. In a further example, the low fire condition may be 50% of a maximum system BTU or may be between 60-80% of a high fire condition, as will be explained herein. The low fire condition is exemplarily an energy output that is less than the energy output needed to maintain a cooking temperature setpoint at the input sensors when the cooking conveyor 3 is free of food product.

The monitored temperatures are compared at 206 to the cooking temperature setpoint, which in a non-limiting example is 830° F. but may be controlled to any of a variety of temperatures. The cooking temperature setpoint may be based upon the type of food product to be cooked and/or the environmental conditions sought to be maintained within the enclosure. If any of the monitored temperatures from the inlet sensors 44 falls below the cooking temperature setpoint at 206, the controller operates at least one heat source 2 to the high fire condition at 208. In an example, the high fire condition may be 80,000 BTU. In further examples the high fire condition may be 80% of a maximum system BTU output or may be at least 50% greater than the low fire condition. The high fire condition is exemplarily an energy output that is greater than the energy output needed to maintain a cooking temperature setpoint at the input sensors, including when food product is on cooking conveyor 3 within the enclosure 1.

In examples, the broiler includes a plurality of heat sources. In the example as currently detailed herein, the broiler includes three heat sources, two heat sources located above the cooking conveyor and one heat source located below the cooking conveyor. In examples, all of the heat sources are operable to at least one or both of the high fire condition and the low fire condition. In an example, all of the heat sources are operable to the low fire condition, while some (e.g. one or two) or all (e.g. three) of these heat sources may be operated to the high fire condition. In a specific example, heat source Heat 1 positioned above the cooking conveyor 3 and closest to the inlet 12 and the heat source Heat 3 positioned below the cooking conveyor 3 are operated between the high fire condition and the low fire condition as described herein while the heat source Heat 2 positioned above the cooking conveyor 3 and furthest from the inlet 12 is maintained in the low fire condition.

The inlet sensor 44, of the plurality of inlet sensors 44 respectively positioned relative to lanes of food product on the cooking conveyor 3, that produced the measured temperature below the cooking temperature setpoint is monitored by comparing a current temperature from that temperature sensor to an upper temperature setpoint at 210. The upper temperature setpoint may exemplarily be 3° F. above the cooking temperature setpoint. In other examples, the upper temperature set point may be between 1° F. and 10° F. above the cooking temperature setpoint, other upper temperature setpoint values may also be used. So long as at least one of the input sensor(s) that measured a temperature below the cooking temperature setpoint continues to measure a temperature below the upper temperature setpoint, the at least one heat source is operated in the high fire condition at 208. Once all of the current measured temperatures are at or above the upper temperature setpoint, the method returns to the monitoring at 202 and the at least one heat source is operated in the low fire condition at 204. In an example, all of heat sources Heat 1, Heat 2, and Heat 3 are operated in the low fire condition.

Figure 3:
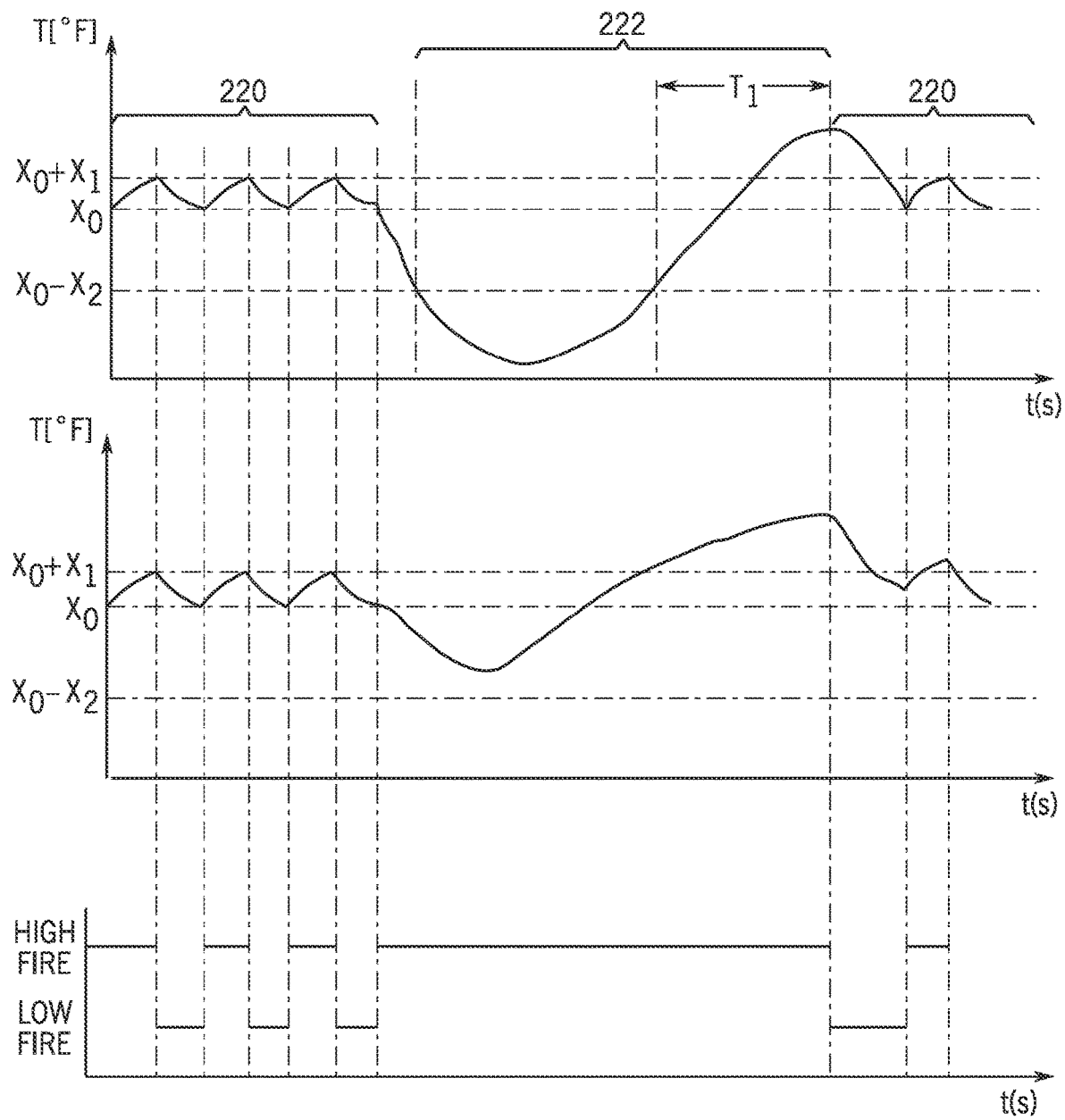
FIG. 3 is a graph that depicts an example of heating element operation.

The process described above may be considered to be an idle mode operation of the broiler. Idle mode operation is exemplarily depicted by reference 220 in FIG. 3. FIG. 3 presents example coordinated graphs of temperature measurements of two different inlet sensors 44 as graph A and graph B. Graph A and graph B are exemplify the temperature outputs of input sensors respectively associated with different lanes of the cooking conveyor 3. FIG. 3 further presents a coordinated graph of the high fire/low fire operational condition of the at least one heat source as graph C. As in the example above, the Heat 2 may be maintained in the low fire condition, while the operation shown in graph C of FIG. 3 is representative of the operation of Heat 1 and Heat 3. The feedback of this idle mode operation will generally maintain the temperature at the inlet sensors 44 between the cooking temperature setpoint and the upper temperature setpoint.

At 212, the measured temperatures from the temperature sensors are evaluated to detect if the broiler should enter a cooking mode operation, which is exemplarily depicted by reference 222 in FIG. 3. At 206, if a determination is made that at least one monitored temperature has fallen below the cooking temperature setpoint, while the at least one heat source is operated into the high fire condition at 208, the measured temperatures are further evaluated at 212. The measured temperatures are further compared to a lower temperature setpoint ($X_0$-$X_2$). In a non-limiting example $X_2$ is 15° F., therefore in an example ($X_0$-$X_2$)=815° F. However, it will be recognized that $X_2$ may be any of a variety of temperatures which may be set by the manufacturer or by the user. $X_2$ may exemplarily be a value between 1-50° F. as suitable for the specific use of the broiler. In an example, $X_2$ is selected as a temperature indicative of a detected temperature drop temperature measurement from one or more of the input sensors when uncooked (or frozen) food product is introduced to the inlet of the broiler. Thus, a drop in the measured temperature to a temperature below the lower temperature setpoint is indicative of a new food product entering the broiler in the lane of the cooking conveyor associated with the monitored temperature sensor. This detection of the temperature below the lower temperature setpoint at 212 causes the broiler to be controlled to operate in the cooking mode operation as described herein.

It will be recognized that in certain instances, for example, if only one food item enters the inlet of the broiler, and the broiler currently has sufficient heat capacity, that none of the temperatures measured by the temperature sensors may fall below the lower temperature setpoint. In such a situation, the broiler may continue to operate in the idle mode, using the controls of the idle mode method to complete the cooking cycle of the food item without entering the cooking mode operation. However, particularly if multiple food products enter the inlet of the broiler simultaneously or in succession, such as by operation of the loading conveyor 8 and the loading assembly 42, then the temperatures measured at the input sensors will fall below the lower temperature setpoint and the controller 46 will operate the broiler in the cooking mode operation.

If, at 212, at least one of the monitored temperatures falls below the lower temperature setpoint, then at 214, the at least one heat source is operated in a high fire condition. However, it is likely that the at least one heat source is already in operation in the high fire condition since, as described above in the idle mode operation, operation at the high fire condition is initiated upon the measured temperature at or below the cooking temperature setpoint, and the lower temperature setpoint is necessarily below the cooking temperature setpoint. In the cooking mode operation, initiated when the at least one measured temperature falls below the lower temperature setpoint, the control of the at least one heat source differs from that of the operation of the at least one heat source in the idle mode operation.

At 216, the current temperature(s) of the input sensor(s) that fell below the lower temperature setpoint are compared to the lower temperature set point. If at least one of the temperature sensors produces a temperature measurement that is below the lower temperature set point, then the at least one heat source is maintained in the high fire condition. It is recognized that during use of the broiler in the cooking mode operation, that while the operation of the at least one heat source in the high fire condition increases the temperature inside the enclosure of the broiler, in use, new food product, either fresh or frozen may be sequentially introduced through the inlet into the broiler. The introduction of new food product has the effect of lowering the temperature, therefore, when new food product is continuously being introduced through the inlet to the broiler, the measured temperatures at the input sensors may remain below the lower temperature set point for an extended duration of time. Eventually, as the at least one heat source operates in the high fire condition the temperatures measured by the input sensors will increase. At 216, once all of the temperature sensors produce temperature measurements above the lower temperature setpoint, then at 218 a timer is started to measure a predetermined length of time $T_1$. In an example, the predetermined length of time is 45 seconds. In other examples the predetermined length of time may be between 15 seconds and 90 seconds. In still further examples, the predetermined length of time may be greater than 90 seconds. In another example, the predetermined length of time is ½ the length of time that it takes the cooking conveyor to make one complete revolution. This predetermined length of time thus may be determined from/calculated based upon a cooking conveyor speed, which itself may be fixed or dynamic.

During the time that the timer operates to count down the predetermined length of time, the at least one heat source is also operated at the high fire condition at 214 and the temperatures measured by the temperature sensors are monitored to remain above the lower temperature set point at 216.

If the measured temperature at any of the input sensors falls below the lower temperature setpoint, then the timer is reset and not started again until all of the temperature sensors measure a temperature above the lower temperature setpoint. If the timer at 218 counts down the entirety of the predetermined time and expires, then the method returns to the monitoring at 202 and the at least one heat source is operated according to the idle mode operation. In operation, maintaining the broiler in the high fire condition for the duration of time $T_1$ may result in a measured temperature above the upper temperature setpoint as shown in FIG. 3, thus when switching to idle mode operation, the controller 46 operates the heat sources in the low fire condition at 204.

Referring back to FIG. 1, in some embodiments, the controller 46 is communicatively connected to a kitchen management system (KMS) 48 and receives cooking models or other control signals therefrom. In various embodiments, the KMS 48 may be directly communicatively connected to the broiler 100 or may be communicatively connected to the broiler 100 through an Internet-of-things (IoT) communications system which provides distributed communication to communication-enabled devices in the kitchen, including the broiler 100. The warming assembly 110 may further include an indicator light 14 positioned on the exterior of the enclosure 1. While a single indicator light 14 is depicted, in other examples, the warming assembly 110 may include two or more indicator lights 14. Each indicator light 14 may be electrically controlled and may respond to sensors or timers that determine when food product has been deposited in the pan 6.

In other examples, as provided herein, the indicator devices 14 may include any device that alerts the user to the completion of a cook cycle, that is, a need to remove a pan 6 from the warming assembly 110 after such pan 6 has been filled with cooked food product 9. For example, the indicator device 14 may be a light that illuminates to provide a visual alert or a speaker that emits a sound to provide an audible alert. In some cases, the indicator device 14 may include a user interface display or a component of a user interface display that displays a message to a user upon completion of a cook cycle. The indicator device 14 may be communicatively connected to the controller 46 and may provide a cook cycle alert responsive to a control signal Si. The controller 46 may for example determine the length of a cook cycle as described herein based at least in part upon the measurements from the temperature sensors and/or the operational mode of the broiler as described above.

One or more indicator devices 14 may be used in examples of the broiler 100 for example to accommodate multiple cooking conveyors of a boiler. Each cooking conveyor may be configured to deposit finished food product 9 into a different pan 6. An indicator device 14 located proximate to the respective pan 6 and illuminate corresponding to the status of the cook cycle of that associated conveyor 3/pan 6. For example, if some cooked food product 9 has been deposited into a pan 6 but the cook cycle is still ongoing, the indicator light 14 may be illuminated red to indicate to a user that additional cooked food product 9 will be deposited into the pan 6 before the end of the cook cycle, and thus the user should not yet remove the pan 6 from the warming assembly 110. Once the cook cycle has expired and the full batch of cooked food product 9 has been deposited into the pan 6, the indicator light 14 may be illuminated green to indicate to a user that the pan 6 is ready to be removed from the warming assembly 110. If the cook cycle has been completed for a set amount of time without the full pan 6 being removed, the indicator light 14 may illuminate yellow to indicate that the food product 9 has been held for a long time.

In various other examples come up the indicator device 14 may instead be an LED display or an LCD that includes a message component that is configured to display a status of the broiler or the pan (e.g., "Ready," "Cycle in Progress"). In some implementations, the indicator device 14 may be common to all of the pans 6 within the warming assembly 110, and the message component may be configured to indicate the status of each pan six. For example, the messages displayed by the message component may include "Pan 1 Ready,' "Pan 3 Cycle in Progress" or the like. Such a message component may be presented in conjunction with an indicator light as described above.

A food product discharge ramp 4 is shown to be situated within the enclosure 1 at the end of the cooking conveyor 3, opposite the food product inlet 12. The food product discharge ramp 4 may be any device or assembly that deposits finished food product 9 in a desired location for further preparation, service, or storage. As will be described in further detail herein, in examples the discharge ramp 4 further redirects the finished food product 9 in a direction generally opposite the direction in which the food product 9 is moved by the conveyor 3. That is, in examples, if the conveyor 3 moves the food product 9 from the inlet 12 at the front of the broiler toward a rear of the broiler, the discharge ramp 4 redirects the food product 9 towards the front of the broiler 100.

The food product discharge ramp 4 may deposit finished food product 9 into a warming assembly 110. In an example, the warming assembly 110 is disposed within the enclosure 1 and beneath the cooking conveyor 3. In the example of FIG. 1, the warming assembly 110 is shown to include an upper heating element 5, a lower heating element 7, and a blocking element 10. In other examples as described herein, one or both of the upper heating element 5 and the lower heating element 7 may be replaced instead with heat redirected from at least one of the heat sources 2. Variations of the warming assembly 110 are disclosed herein and all are considered to be within the scope of the disclosed warming assembly 110 as well as other combinations of these disclosed variations although not explicitly shown.

Figure 4:
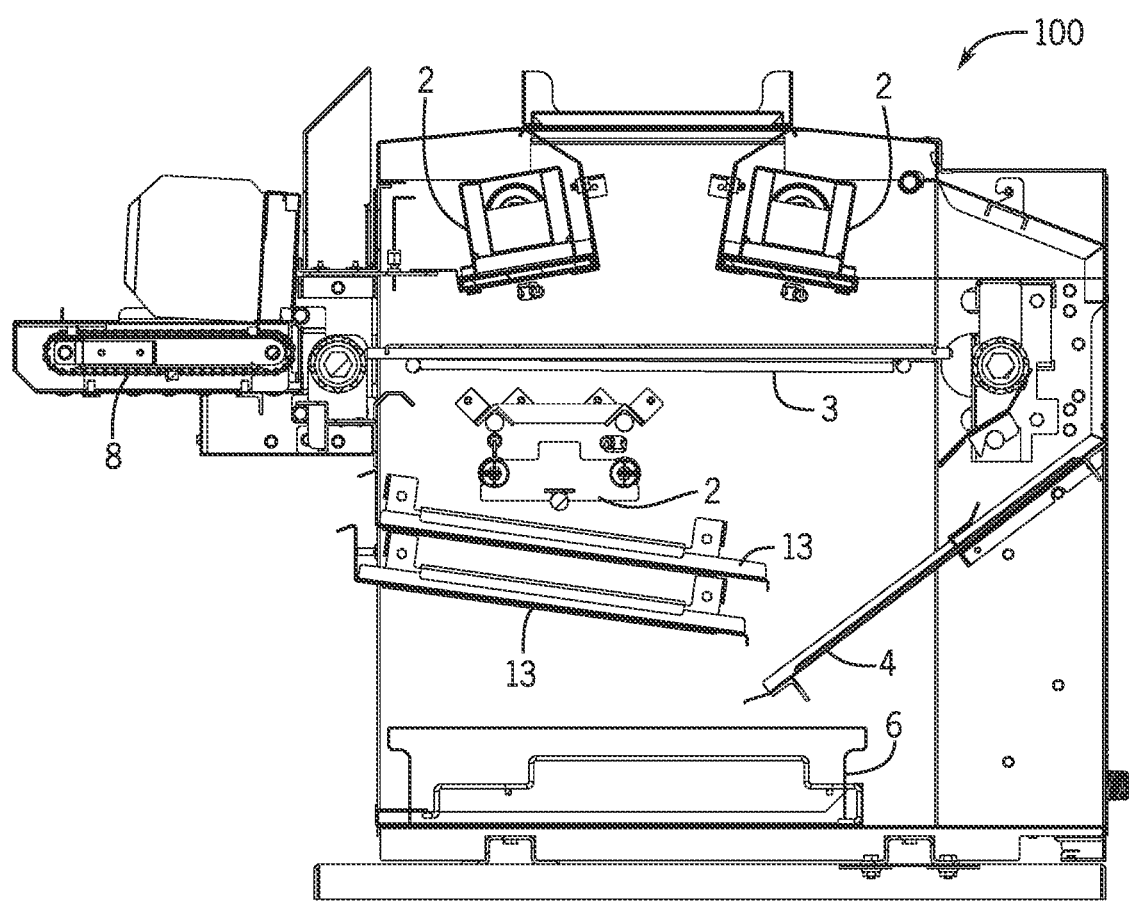
FIG. 4 is a sectional view of an example of a broiler.

FIG. 4 is a sectional view of an example of a broiler 100. The broiler 100 of FIG. 4 may include many or all of the components as shown and described above with respect to FIG. 1. FIG. 4 further depicts that the heat sources 2 are exemplarily different types of heat sources within the broiler 100. In the example depicted in FIG. 4, the heat sources 2 located above the cooking conveyor 3 are exemplarily gas-fired infrared (IR) burners, while the heat source 2 located below the cooking conveyor 3 is a pipe or tube burner. The gas-fired IR burners may include a metal foam or a metal mesh that is heated by gas combustion to a temperature that emits IR energy in the direction of the cooking conveyor 3. The broiler 100 further exemplarily includes at least one drip tray 13 positioned below the cooking conveyor 3 and above the pan 6. In a further example, the broiler 100 includes a drip tray 13 associated with each lane for food product within the broiler. As described above, each lane for food product across the cooking conveyor(s) 3 may further have a pan 6 respectively located within the warming assembly 110 to receive the cooked food product 9 off of the ramp 4 from a respective lane of the cooking conveyor. The drip tray 13 is positioned below the cooking conveyor 3 to collect any liquid, fat, grease, and food particles from the cooking food product that falls through the cooking conveyor 3. Additionally, the drip tray 13 is angled in a direction towards the ramp 4, whereby liquid, fat, grease, and food particles are directed onto the ramp 4 and thereby into the pan 6 with the cooked food product.

Figure 5:
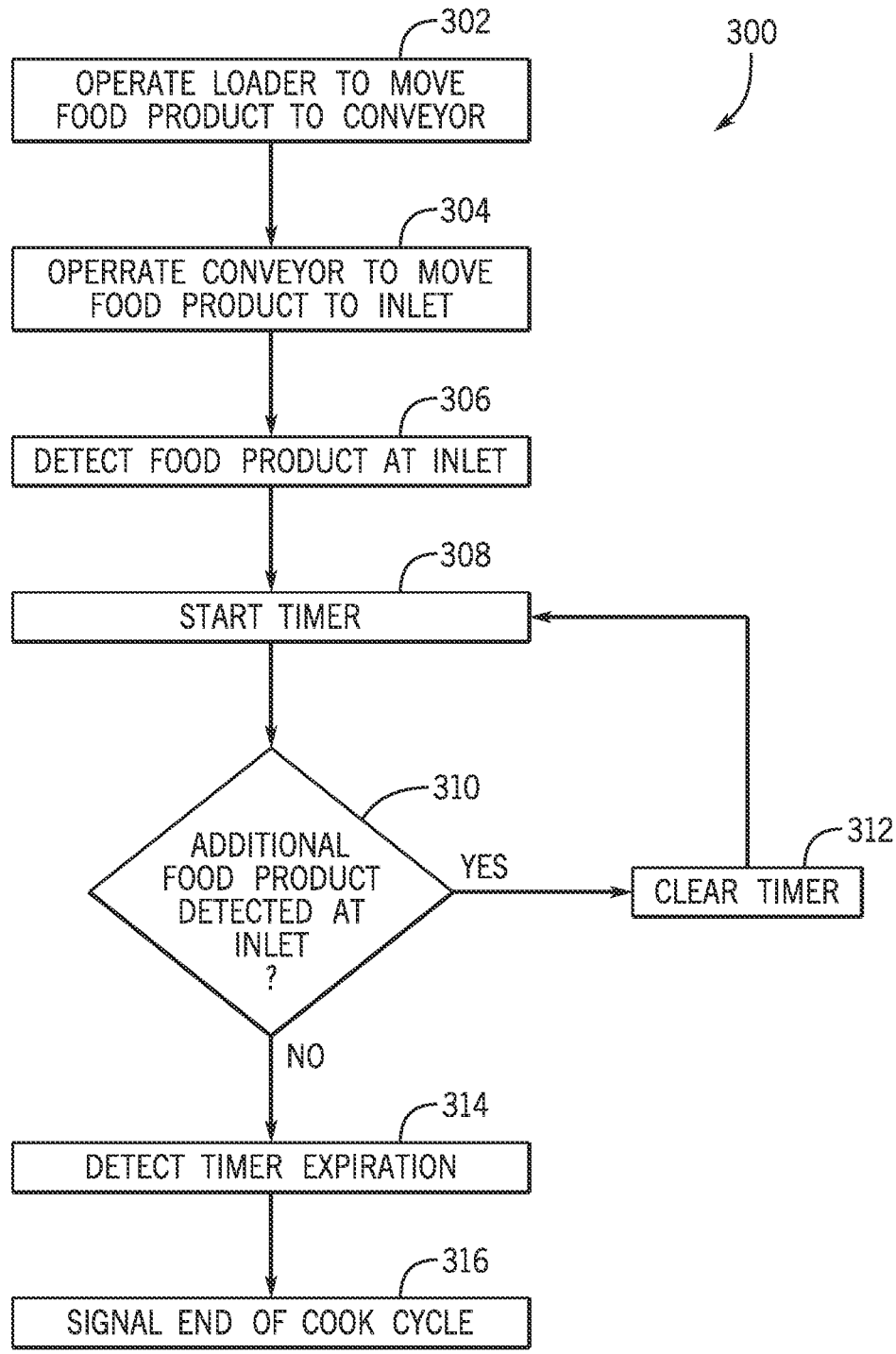
FIG. 5 is a flow chart that depicts an example of a method of detecting the length of a cooking cycle.

FIG. 5 is a flow chart that depicts an exemplary embodiment of a method 300 of detecting the length of a cooking cycle, for example, using the broiler 100 depicted in FIGS. 1, 4 or any other broiler configuration as will be recognized in view of the present disclosure. It will be recognized that the controller 46 may execute computer-readable code as previously described to carry out the functions and perform the control operations as described in the performance of method 300. The method 300 may be carried out in conjunction with the method 200 as described above.

At 302, the controller 46 operates the loading assembly 42 to move the food product 9 to the loading conveyor 8. Once deposited on the loading conveyor 8, at 304, the controller 46 operates the loading conveyor 8 to move the food product 9 to the food product inlet 12. As noted above, in some embodiments, the broiler 100 does not include one or both of the loading conveyor and the loading assembly 42. In these embodiments, a user may manually place food product 9 onto the cooking conveyor 3.

Next, at 306 the controller 46 detects the presence of the food product 9 at the food product inlet 12. The controller 46 detects the presence of the food product 9 based on data received from the inlet sensor 44. In the examples provided above, the inlet sensor 44 is a temperature sensor of the temperature internal the broiler 100 at the food product inlet 12. The temperature measured by the temperature sensor falling below the lower temperature setpoint is indicative a food product 9 entering the food product inlet 12. The continued measurement of temperatures from by the temperature sensor that are below the lower temperature set point is indicative of additional food product 9 entering the food product inlet 12.

At 308, the controller 46 starts a timer. The timer is exemplarily the same timer operated at 218 in method 200. At 310, the controller 46 determines whether additional food product 9 has been detected by the inlet sensor 44 at the food product inlet 12. This detection can for example be as previously described above with the measured temperature falling below the lower temperature set point. In response to a determination that additional food product has been detected, method 300 continues with 312 in which the controller resets the timer and does not begin the timer again until the monitored temperatures are above the lower temperature set point as described above.

However, if at 310 the controller 46 determines that additional food product 9 has not been detected at the inlet 12 (e.g. the monitored temperatures have remained above the lower temperature set point), method 300 proceeds to 314 as the controller 46 detects that the timer has expired. The expiration of the timer may be detected by the controller 46 once the timer reaches a target value. In some examples, the target value of the timer corresponds with an expected length of time for the food product 9 to travel the full length of the cooking conveyor 3. It will be recognized that this may be determined for a conveyor speed and thus the expected time at 314 may be calculated or otherwise determined by the controller based upon a set or detected conveyor speed. In some examples, the target timer value includes the travel time of the cooking conveyor 3 plus a buffer time. For example, the buffer time may account for the time the finished food product 9 must travel along the discharge ramp 4 before being deposited in a food storage container.

Upon expiration of the timer, the controller 46 proceeds to signal the end of the cook cycle at 316. In addition, as explained above, the controller may operate the at least one heat source to idle mode operation. In an exemplary embodiment, signaling the end of the cook cycle comprises transmitting a signal to operate the indicator device 14. In various examples, the indicator device 14 may provide a visual or audible notification of the completion of the cook cycle. For example, an indicator light mounted on the broiler may illuminate, or an indicator speaker may emit a beeping noise. In still further examples, the controller 46 may transmit the signal indicating the end of the cook cycle to the KMS 48. Upon receipt of the signal, the KMS 48 may operate additional kitchen equipment to store or serve the finished food product 9.

Returning to the example from above, if the KMS 48 transmits a signal to the controller 46 to prepare 30 hamburger patties, the controller 46 operates the loading assembly 42 to deposit 30 patties in succession onto the loading conveyor 8. The controller 46 operates the loading conveyor 8 to move each patty into the field of view of the inlet sensor 44 positioned above the food product inlet 12. The presence of each new patty in the field of view of the inlet sensor 44 prompts the controller 46 to reset a cook cycle timer. The controller 46 operates the heat sources 2 and the cooking conveyor 3 to cook each patty. After the 30th patty has passed out of the field of view of the inlet sensor 44, the cook cycle timer runs until the target value has expired and the 30th patty has been deposited into a storage area by the discharge ramp 4. At this time, the controller 46 sends a signal to the indicator device 14 to alert a user that all 30 hamburger patties have been prepared. Advantageously, the systems and method described herein significantly reduce the need for a user to actively monitor the broiler 100. Because the user is notified of the end of the cook cycle by the indicator device 14, the user can promptly attend to the finished food product, and ensure it is stored or served in a manner that prevents degradation of the food product in temperature or quality.

In a further example, the broiler may operate in an initial or warm-up operation upon being turned on and/or initialized. Recognizing that the broiler may operate for example, with a cooking temperature set point of 830° F., the broiler may further operate in an initial or warm-up operation wherein all of the heat sources are operated in a high fire condition until the cooking temperature set point is reached. In a further example, at least one of the heat sources may operate at an output temperature greater than the high fire condition, for example, at a maximum rated operational output for the heat source. In one example, this may be an output of 120,000 BTUs.

Citations to a number of references are made herein. The cited references are incorporated by reference herein in their entireties. In the event that there is an inconsistency between a definition of a term in the specification as compared to a definition of the term in a cited reference, the term should be interpreted based on the definition in the specification.

In the above description, certain terms have been used for brevity, clarity, and understanding. No unnecessary limitations are to be inferred therefrom beyond the requirement of the prior art because such terms are used for descriptive purposes and are intended to be broadly construed. The different systems and method steps described herein may be used alone or in combination with other systems and methods. It is to be expected that various equivalents, alternatives and modifications are possible within the scope of the appended claims.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A heat transfer system for heat treating a food product comprising:
   an enclosure comprising a food product inlet, a food product outlet, and a plurality of walls;
   at least one conveyor extending into the enclosure from the food product inlet;
   a plurality of heat sources arranged about the at least one conveyor, the plurality of heat sources configured to output heat towards the at least one conveyor;
   at least one temperature sensor arranged at the food product inlet relative to the at least one conveyor; and
   a controller configured to receive temperature measurements from the at least one temperature sensor and to operate at least one heat source of the plurality of heat sources between a high fire condition and a low fire condition in an first mode operation and a second mode operation;
   wherein the controller, in the first mode operation, is configured to maintain the temperature measurements between a first temperature setpoint and an upper temperature setpoint, the upper temperature setpoint being above the first temperature setpoint;
   wherein the controller switches to operate in the second mode operation when the temperature measurements received by the controller fall below a lower temperature setpoint below the first temperature setpoint, and in the second mode operation the controller is configured to operate at least one heat source of the plurality of heat sources in the high fire condition for a predetermined time period that begins after the temperature measurements received by the controller rise above the lower temperature setpoint.

2. The heat transfer system of claim 1, wherein the controller, in the idle-first mode operation, operates at least one of the plurality of heat sources in the high fire condition until the temperature measurements reach the upper temperature setpoint, and the controller operates at least one of the plurality of heat sources in the low fire condition until the temperature measurements reach the first temperature setpoint.

3. The heat transfer system of claim 1, further comprising a plurality of temperature sensors, the plurality of temperature sensors comprising the at least one temperature sensor, and temperature sensors of the plurality of temperature sensors are each arranged at the food product inlet relative to a lane on the at least one conveyor.

4. The heat transfer system of claim 3, wherein the controller is configured such that when the temperature measurements from a temperature sensor of the plurality of temperature sensors falls below the lower temperature setpoint, the predetermined time period starts after the temperature measurements received by the controller rise above the lower temperature setpoint.

5. The heat transfer system of claim 1, further comprising:
   a discharge ramp positioned below the conveyor at an end of the conveyor opposite the food product inlet; and
   a food product tray positioned below the conveyor and configured to receive food product from the conveyor directed into the food product tray by the discharge ramp.

6. The heat transfer system of claim 5, further comprising:
   a drip tray positioned below the conveyor and angled in a direction towards the discharge ramp, wherein the drip tray is configured to collect grease and direct the grease onto the discharge ramp for collection in the food product tray.

7. The heat transfer system of claim 1, wherein in the low fire condition, the plurality of heat sources output energy that is less than an energy output required to maintain the first temperature setpoint at the at least one temperature sensor.

8. The heat transfer system of claim 1, wherein in the high fire condition, the plurality of heat sources output energy that is greater than an energy output required to exceed the upper temperature setpoint at the at least one temperature sensor.

9. The heat transfer system of claim 1, wherein the plurality of heat sources comprises a first heat source positioned above the conveyor and configured to remain in the low fire condition and a second heat source configured to operate at the low fire condition and the high fire condition.

10. A heat transfer system for heat treating a food product comprising:
    an enclosure comprising a food product inlet, a food product outlet, and a plurality of walls;
    at least one conveyor extending into the enclosure from the food product inlet;
    a plurality of heat sources arranged about the at least one conveyor, the plurality of heat sources configured to output heat towards the at least one conveyor and the plurality of heat sources comprises a first heat source positioned above the conveyor and configured to remain in a low fire condition and a second heat source is positioned above the conveyor towards the food product inlet and configured to operate at the low fire condition and a high fire condition, wherein the first heat source is internal the enclosure from the second heat source;
    at least one temperature sensor arranged at the food product inlet relative to the at least one conveyor; and
    a controller configured to receive temperature measurements from the at least one temperature sensor and to operate the second heat source between the high fire condition and the low fire condition in a first mode operation and a second mode operation.

11. The heat transfer system of claim 10, further comprising a third heat source positioned below the conveyor and configured to operate at the low fire condition and the high fire condition.

12. A method of heat treating a food product, the method comprising:
    providing a heat transfer system comprising an enclosure comprising a food product inlet, a food product outlet, and a plurality of walls, a conveyor, a plurality of heat sources arranged about the conveyor, the plurality of heat sources configured to output heat towards the conveyor, at least one temperature sensor arranged at the food product inlet relative to the conveyor, and a controller;

monitoring a current temperature at the at least one temperature sensor;

determining a mode of operation between an first mode and a second mode with the controller based upon the current temperature;

operating at least one of the heat sources between a high fire condition and a low fire condition based upon the current temperature from the at least one temperature sensor and the mode of operation;

wherein the first mode of operation comprises operating at least one of the heat sources between the high fire condition and the low fire condition to maintain the current temperature between a first temperature setpoint and an upper temperature setpoint, the upper temperature setpoint being greater than the first temperature setpoint, wherein the controller determines the second mode of operation if the current temperature falls below a lower temperature setpoint, the lower temperature setpoint being below the first temperature setpoint; and wherein the second mode of operation comprises:
  operating at least one heat source of the plurality of heat sources in the high fire condition;
  starting a timer when the current temperature exceeds the lower temperature setpoint; and
  when the timer exceeds a predetermined time, operating the at least one heat source of the plurality of heat sources in the low fire condition and determining the first mode of operation.

13. The method of claim 12, wherein the first mode of operation comprises:
  operating the plurality of heat sources in the low fire condition;
  comparing the current temperature to the first temperature setpoint;
  if the current temperature falls below the first temperature setpoint, operating at least one heat source of the plurality of heat sources in the high fire condition;
  comparing the current temperature to an upper temperature setpoint; and
  if the current temperature exceeds the upper temperature setpoint, operating the at least one heat source of the plurality of heat sources in the low fire condition.

14. The method of claim 12 wherein the conveyor defines a plurality of food product lanes across the conveyor and comprising a plurality of temperature sensors which comprises the at least one temperature sensor, with a temperature sensor of the plurality of temperature sensors positioned at the food product inlet relative to each lane of the plurality of food product lanes across the conveyor.

* * * * *